Dec. 26, 1933.  G. H. PFEFFERLE  1,940,729
SPLIT SLEEVE FOR REPAIRING PIPE JOINTS
Filed March 20, 1931    4 Sheets-Sheet 1
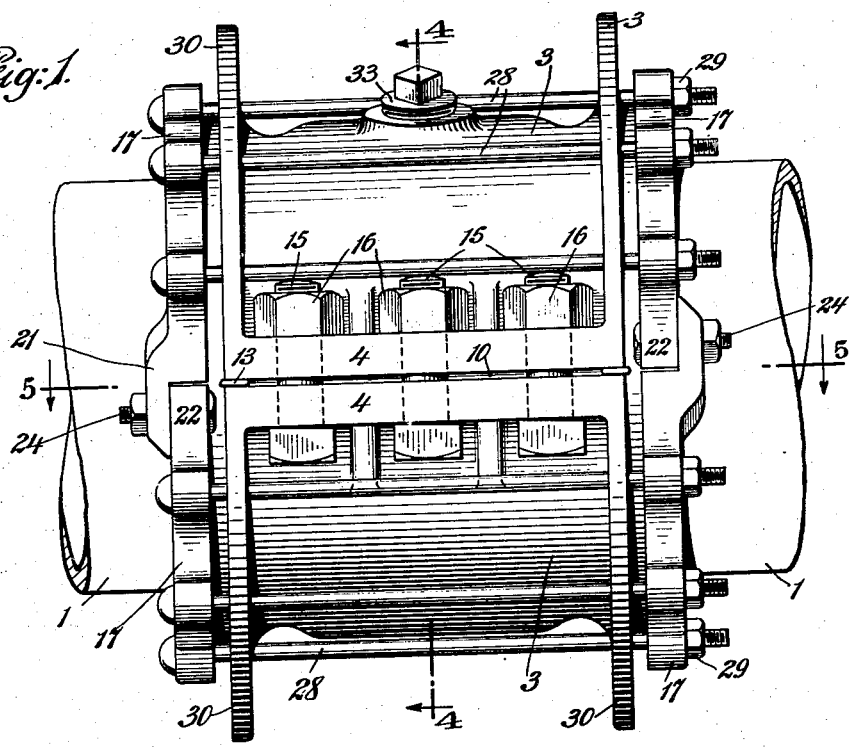
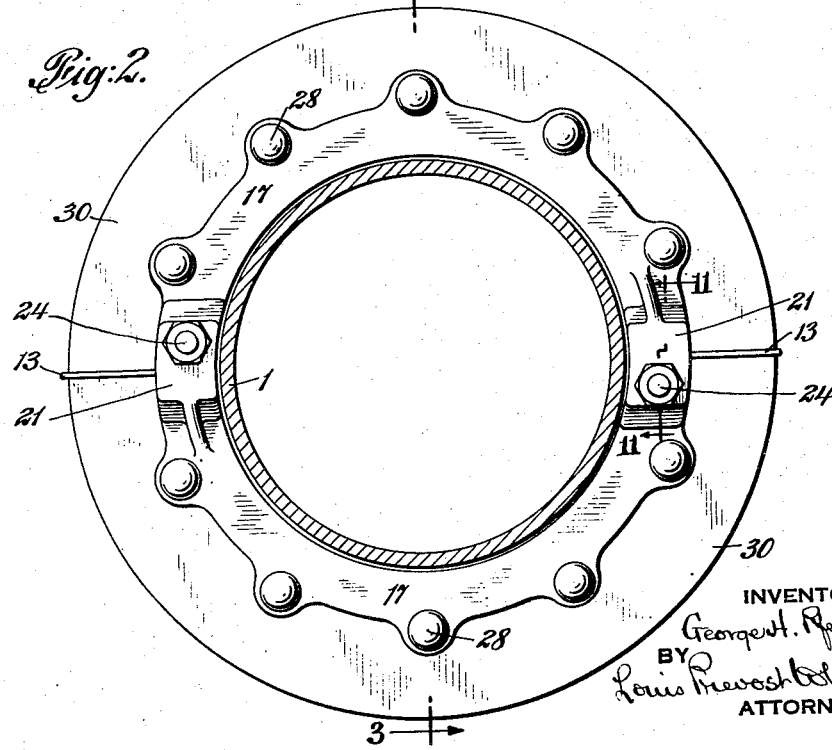
INVENTOR
George H. Pfefferle
BY
Louis Prevost Whitaker
ATTORNEY Dec. 26, 1933.    G. H. PFEFFERLE    1,940,729
SPLIT SLEEVE FOR REPAIRING PIPE JOINTS
Filed March 20, 1931    4 Sheets-Sheet 2

INVENTOR
George H. Pfefferle
BY
Louis Prevost Whitaker
ATTORNEY

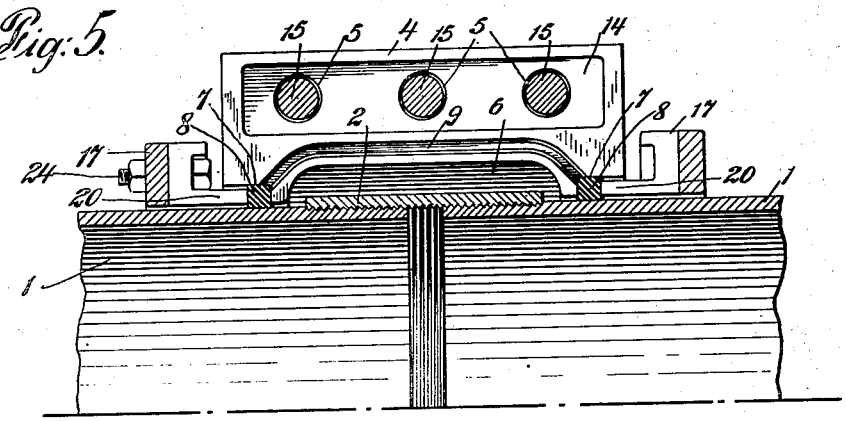
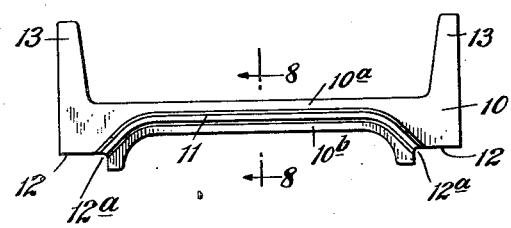
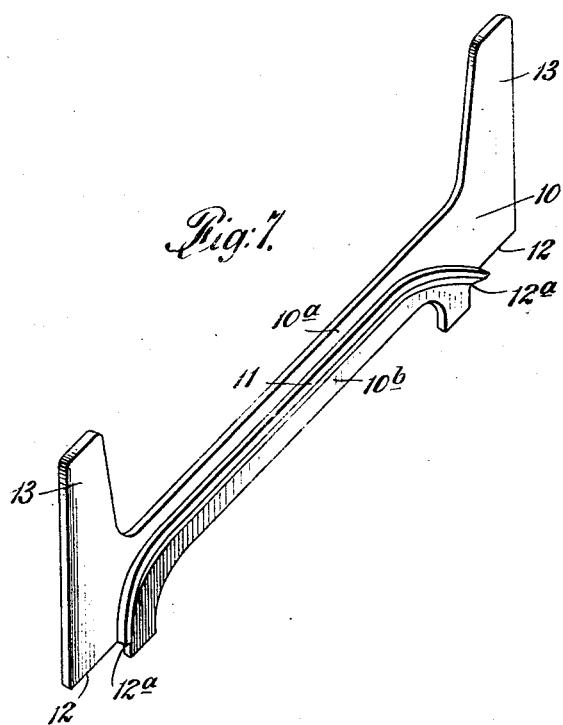
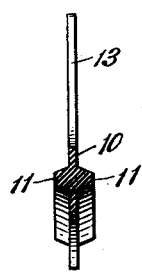

Dec. 26, 1933.   G. H. PFEFFERLE   1,940,729
SPLIT SLEEVE FOR REPAIRING PIPE JOINTS
Filed March 20, 1931   4 Sheets-Sheet 4
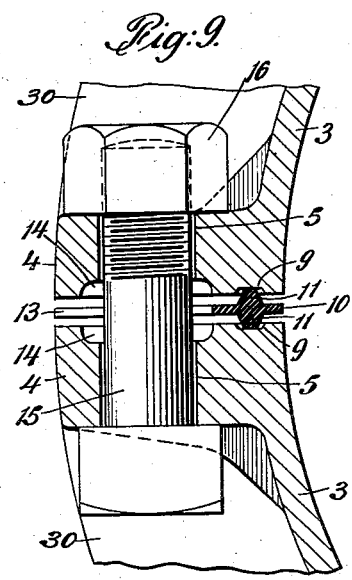
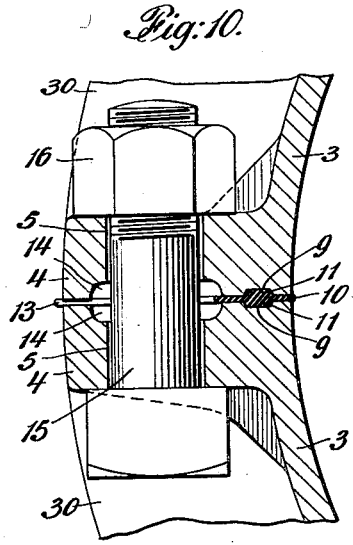
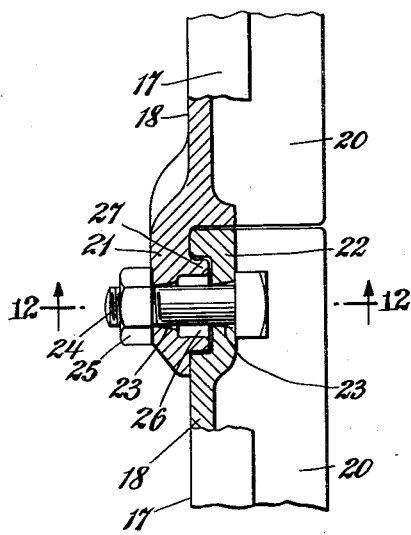
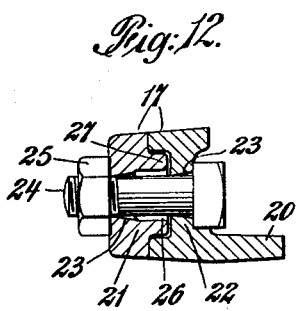
INVENTOR
George H. Pfefferle
BY
Louis Prevost Whitaker
ATTORNEY Patented Dec. 26, 1933

1,940,729

UNITED STATES PATENT OFFICE 1,940,729

SPLIT SLEEVE FOR REPAIRING PIPE JOINTS

George H. Pfefferle, Bradford, Pa., assignor to S. R. Dresser Manufacturing Company, Bradford, Pa., a corporation of Pennsylvania Application March 20, 1931. Serial No. 524,002

6 Claims. (Cl. 285—99)

My invention consists in the novel features hereinafter described, reference being had to the accompanying drawings which illustrate one embodiment of the same, selected by me for purposes of illustration, and the said invention is fully disclosed in the following description and claims.

My present invention consists in an improved split sleeve such as is used mainly for repairing leaky joints in pipe lines. These split sleeves, whether formed of cast metal or wrought metal, ordinarily comprise a plurality of sleeve segments, usually two in number, adapted to be placed together and completely surround the joint, the segments being provided laterally with flanges which are bolted together upon flat side packings of rubber or other suitable material, the split sleeve being formed at each end with means for receiving an end packing wrapped around the pipe and placed under compression by suitable clamping ring also formed ordinarily in segments and drawn toward the sleeve by suitable bolts. As obviously the side flanges of the sleeve section must be brought into extremely close relation in order to form the sleeve, the side packings must be relatively thin and do not always provide a sufficient body of compressible material to form and maintain the lateral joints of the sleeves at all times gas-tight.

According to my present invention the opposed faces of the side flanges of the sleeve segments are provided with longitudinally disposed grooves of substantially uniform width and depth extending from one end packing recess to the other, and the side packings which are formed of compressible elastic material, usually rubber or rubber composition are provided on opposite faces with correspondingly disposed beads to engage the grooves in the side flanges, each bead being of greater height and of less width than the corresponding dimensions of the groove which it engages. It follows from this unique construction that throughout the length of the bead portion of the side packings, they have a thickness several times the thickness of the flat main body portions, and when the side flanges are bolted together, the pressure of the side bolts is concentrated upon a relatively small area of the side packings, represented by the width of the beads. As the side flanges are drawn together, the beads are compressed between them and laterally expanded so as to completely fill the corresponding grooves of the opposed faces of the side flanges. This forces the material of the bead firmly into contact with the side walls of the grooves and produces an interlocking engagement between the side packings and side flanges. This interlocking engagement prevents lateral displacement of the side packings during the tightening of the side bolts and results in providing throughout the extent of the beads a body of packing material of very considerable thickness under extremely high pressure, thus insuring a tight joint at all times. When the side bolts are fully tightened the side flanges are also brought tightly together upon the laterally disposed flat portions of the side packing as usual, but these flat portions are not relied upon mainly for effecting a tight joint between the sleeve sections, although obviously contributing to that end.

My invention also comprises certain novel features of construction and combination of parts hereinafter fully described and particularly pointed out in the claims.

Referring to the accompanying drawings which show one embodiment of my invention, selected by me for purposes of illustration, Fig. 1 is a side elevation of my improved split sleeve in operative position in connection with a pipe line.

Fig. 2 shows an end elevation, the pipe being shown in section.

Fig. 5 is a partial horizontal section on line 5—5 of Fig. 1, with the side packing removed.

Fig. 6 is a plan view of one of the side packings.

Fig. 7 is a perspective view of the same, drawn to a larger scale.

Fig. 8 is a cross section of Fig. 6, on line 8—8.

Fig. 9 is an enlarged detail sectional view illustrating a pair of opposed side flanges, the interposed side packing, and one of the side bolts, before the said bolts are tightened.

Fig. 10 is a similar view showing the same parts after the side bolts have been tightened.

Fig. 11 is a detail view, partly in section, showing the overlapping portions of the clamping rings, on the line 11—11 of Fig. 2.

Fig. 12 is a section on the line 12—12 of Fig. 11.

Figure 3:
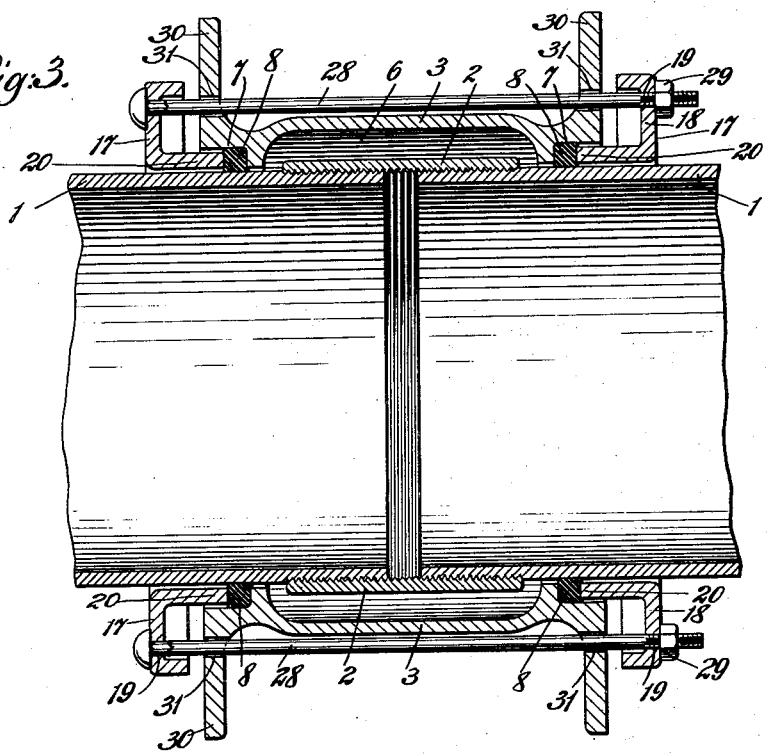
Fig. 3 represents a vertical section on line 3—3 of Fig. 2.

In the drawings, 1, 1, represent two pipe sections of a pipe line, united in this instance by a screw collar, 2. The sleeve segments are indicated at 3, 3, and as shown these segments are formed of cast iron or malleable cast iron. Each of the sleeve segments is formed at each side with a lateral clamping flange, 4, provided with a plurality of bolt holes, 5, adapted to register with the bolt holes in the corresponding flanges of the segment. The interior of the sleeve segments forms a chamber, indicated at 6, which is of sufficient diameter to entirely enclose the joint connecting the pipe sections, 1, 1. It will be understood that the internal diameter of this chamber will be such as to accommodate the type of coupling for which it is designed to be used. Obviously, the particular example illustrated in the drawings could be used for the repair of a welded joint as well as a joint formed by a screw collar, and it will also be obvious that where the sleeve is intended to enclose a bell and spigot joint, or a joint effected, for example, by one of the well known Dresser type couplings, the interior diameter of chamber, 6, will be made of sufficient size to surround the particular joint to which it is to be applied. The particular dimensions or form of the chamber, 6, do not in any way affect the construction of the sleeve so far as relates to my present invention. Each of the sleeve segments is provided at each end with a segmental recessed portion, indicated at 7, so constructed that when the segments are placed together, these recesses will form annular recesses for the reception of the end packings, 8, indicated in Figs. 3 and 5, in the usual manner. These end packings are preferably formed of rubber cut from a straight strip or molded to a circular form, with the meeting ends mitered or beveled, so that they may be wrapped around the pipe and inserted in the recess, 7, with the beveled ends overlapped.

The meeting faces of the side flanges, 4, are provided with longitudinally disposed grooves, indicated at 9, the opposite ends of which are curved inwardly so that they will terminate at and communicate with the respective end packing recesses, 7, as clearly shown in Fig. 5. The particular shape of these grooves longitudinally is unimportant and they will naturally follow to a certain extent, the configuration of the chamber, 6. The grooves, 9, are of substantially uniform depth and width, and as indicated in Fig. 9, for example, the lateral walls of these grooves, 9, are conveniently flared outwardly to a slight extent, but this is not essential.

In Figs. 6, 7 and 8 I have illustrated one of the side packings, which comprises a flat sheet, 10, preferably of rubber or other compressible elastic material provided on each of its opposite sides with a bead, 11, extending longitudinally in conformity with the oppositely disposed grooves, 9, of the side flanges. Each of these beads is of greater height than the depth of the groove which it engages, as shown clearly in Fig. 9, and its outer surface is of less width than the groove. The lateral faces of the beads may incline slightly toward each other from the flat portion, 10, outwardly, as shown in the drawings, and this is my preferred construction. The base portions of the beads may be of substantially the same width, or slightly wider than the width of the corresponding groove, 9, at the surface of the side flanges, to insure a very firm and positive engagement between the sides of the beads and the side walls of the grooves when the beads are compressed.

In order to avoid the use of an unnecessary amount of rubber in the flat portions, 10, of the side packings, the meeting faces of the side flanges are preferably cored or recessed, as indicated at 14, around the bolt holes, as clearly shown in Figs. 4, 5, 9 and 10, and while it is not absolutely necessary, the flat portion, 10, of each side packing, is preferably provided at each end with a wing portion, 13, adapted to extend between the outer portions of the meeting flanges, 4, at each end of the recessed portions, 14, thereof.

When the sleeve segments are assembled around a pipe joint, the side packings are placed in position between the meeting faces of the side flanges, with the oppositely disposed beads, 11, 11, lying centrally of the grooves, 9, 9, of the side flanges, and the side bolts, indicated at 15, are passed through the bolt holes, 5, and provided with nuts, 16. As clearly indicated in Fig. 9, the meeting faces of the flanges will be held separated by the bead portions, 11, of the side packings, which nevertheless engage the grooves, 9, 9, so that they will be held in position and will not be liable to be blown out by escaping gas, or otherwise displaced while the side bolts are being tightened. As the side bolts, 15, are tightened up, it will be seen that the pressure will first be exerted to compress the bead portions of the side packing, which thus provide a body of packing material of much greater thickness than the thickness of the flat portion, 10. As the side bolts are tightened, these beads will be compressed and will expand laterally so as to fill the grooves, 9, 9, and interlock firmly therewith. In the tightening of the side bolts, the meeting faces of the side flanges will be brought into contact with the flange portions, 10, of the side packings, and will also compress them to a greater or less extent, as indicated in Fig. 10, until the sleeve segments are brought into the desired relation to each other and form a substantially cylindrical enclosing body entirely surrounding the joint. The end packings, 8, are now inserted in the recesses, 7, on opposite ends of the sleeve, and are compressed therein and into firm contact with the notched or recessed end portions, 12a, of the beads, 11, of the side packings, by means of the clamping rings, 17. These clamping rings, as shown, are of the follower type, comprising plate member, 18, provided with bolt holes, 19, and an annular packing engaging flange, 20. The clamping rings are preferably formed in segments, each having its plate portion, 18, provided at each end with a projecting portion, 21, adapted to overlap and interlock with a portion, 22, of the adjacent segment, and provided at its other end with a corresponding portion, 22, to be engaged by the overlapping portion, 21, of the other segment. The overlapping portions of the ring segments are provided with registering bolt holes, 23, 23, to receive connecting bolts, 24 provided with nuts, 25, which thus unite the segments into a complete ring. In order to relieve the bolts, 24, of strain, the overlapping portions of the ring segments are provided with interlocking portions. Thus in the form of ring shown, and as indicated particularly in Figs. 11 and 12, the end portion, 22, of the plate member of each segment, is provided with a recess, 26, coaxial with the bolt hole, 23, and the overlapping portion, 21, of each ring segment is likewise provided with an annular flange, 27, coaxial with the adjacent bolt hole, 23. As will be clearly seen in Figs. 11 and 12, any strain acting in the plane of the ring intending to separate the segments, will be borne by the interlocking flange, 27, and walls of the recess, 26, of the plate member portions of the ring itself. Each of the clamping rings is also provided with a circular series of bolt holes for the reception of clamping bolts, 28, provided with clamping nuts, 29.

For the purpose of strengthening the segments of the split sleeve, each of said segments is preferably provided at each end with a semi-circular flange, 30, united to the shell of the segment throughout and having its end portions integral with the side flanges, 4, and each of these reinforcing flanges is provided with a plurality of bolt holes, 31, adapted to register with the corresponding bolt holes in the plate members of the clamping rings.

Figure 4:
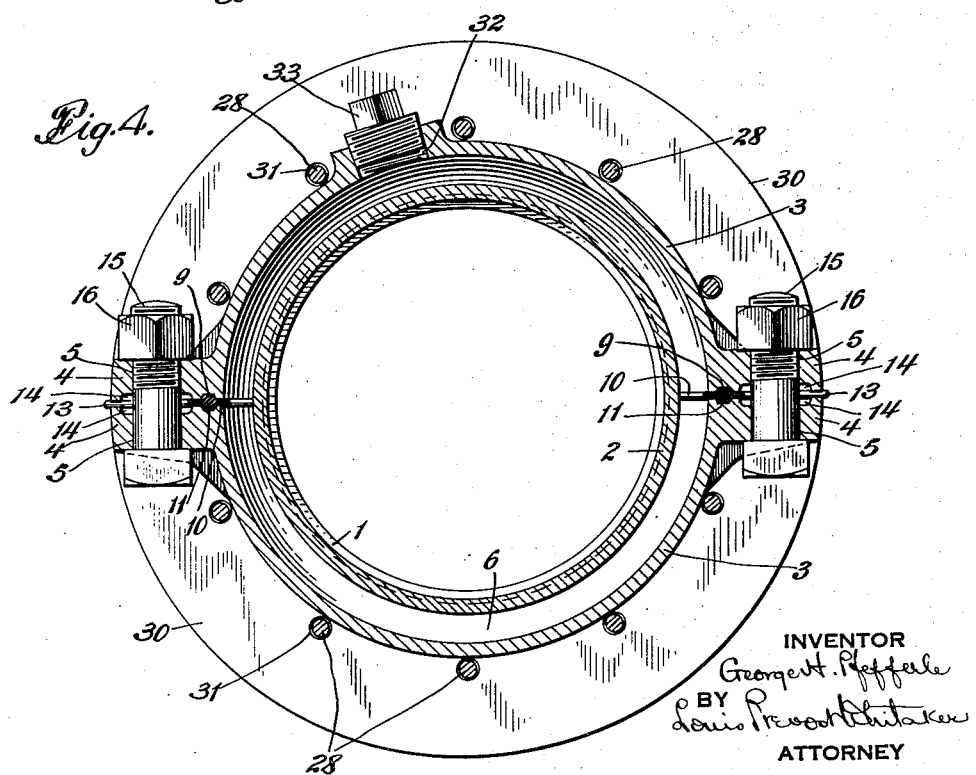
Fig. 4 represents a transverse section on the line 4—4 of Fig. 1.

After the split sleeve is placed in position around the pipe joint and the segments thereof are drawn together upon the side packings, and the end packings, 8, are placed in position, the clamping rings or followers are assembled at the opposite ends of the sleeves and united by the connecting bolts, 24, as hereinbefore described, the clamping bolts, 28, are passed through registering bolt holes in the plate members of the clamping rings, and reinforcing flanges, 30, the nuts, 29, are applied and screwed up, thus forcing the clamping rings or followers toward each other and causing the packing engaging flanges, 20, thereof to compress the end packings, 8, within the end packing recesses, 7, of the sleeve, and forcing the end packings into firm engagement with the outer surfaces of the pipe sections, 1, 1, and the surfaces of the recesses, 7. The end packings, 18, are thereby forced into the recesses, 12a, at opposite ends of the beaded portions of the side packings, and the pipe joint is thus completely sealed within the chamber, 6, of the split sleeve. One of the sleeve segments is preferably provided with an internally threaded aperture, 32, communicating with the interior chamber, 6, which aperture may be left open during the application of the repair sleeve, so as to permit the escape of gas or other fluid, while the side bolts, 24, and clamping bolts, 28, are being tightened, and to prevent the accumulation of pressure within the chamber, 6, from blowing out around the side and end packings and interfering with the proper compression thereof. This threaded aperture, 32, is adapted to be closed as soon as the repair device has been properly tightened up, usually by means of a screw plug, 33, as shown in Figs. 1 and 4. In some instances, where the internal pressure in the pipe line is very high and the volume of escaping gas or other fluid is very great, a cut off cock may be inserted in the threaded aperture, 32, with the valve in open position, and the valve may be closed after the repair device has been fully tightened up. This is a well known procedure in connection with the use of split sleeves for repairing pipe lines, and need not be illustrated or further described.

The end packing rings and side packings herein referred to will ordinarily be most conveniently formed of vulcanized rubber or rubber composition, but it is to be noted that they may be formed of any other suitable compressible material, if desired.

What I claim and desire to secure by Letters Patent is:

1. In a repair device, the combination with a split sleeve provided at each end with an annular end packing recess, said sleeve being formed of segments provided at each edge thereof with an outwardly extending side flange, the opposed faces of the side flanges of said segments being each provided with plane compressing surfaces having a longitudinally disposed groove extending from one of said end packing recesses to the other, side packings of compressible material having flat portions for engaging the plane compressing surfaces of the side flanges, and provided on opposite faces with longitudinally disposed beads for engaging said grooves, said flat portions extending laterally on both sides of said grooves, said beads, when in uncompressed condition, when of greater height than the depth of said grooves, and clamping means for clamping the side flanges of said segments together, to compress the flat portions of said side packings between the plane faces of said opposed faces of said flanges, and to compress said beads within said longitudinally disposed grooves.

2. In a repair device, the combination with a split sleeve provided at each end with an annular end packing recess, said sleeve being formed of segments provided at each edge thereof with an outwardly extending side flange, the opposed faces of the side flanges of said segments being each provided with plane compressing surfaces having a longitudinally disposed groove extending from one of said end packing recesses to the other, side packings of compressible material having flat portions for engaging the plane compressing surfaces of the side flanges, and provided on opposite faces with longitudinally disposed beads for engaging said grooves said flat portions extending laterally on both sides of said grooves, said beads, when in uncompressed condition, being of greater height than the depth of said grooves, and having portions of less width than said grooves, and clamping means for clamping the side flanges of said segments upon said side packings to compress the flat portions thereof between the plane compressing surfaces of said flanges, and simultaneously compress said beads, and expand them laterally into interlocking engagement with the side walls of said longitudinally disposed grooves of the adjacent side flanges.

3. In a repair device, the combination with a split sleeve provided at each end with an annular end packing recess, said sleeve being formed of segments provided at each edge thereof with an outwardly extending side flange, the opposed faces of the side flanges of said segments being each provided with plane compressing surfaces having a longitudinally disposed groove extending from one of said packing recesses to the other, a plurality of bolt holes exterior to said plane compressing surfaces, and recessed portions surrounding said bolt holes, side packings having flat portions for engaging the plane compressing surfaces of the side flanges and provided on opposite faces with longitudinally disposed beads for engaging the said grooves, said beads, when in uncompressed condition, being of greater height than the depth of said grooves, clamping bolts for engaging the bolt holes in the adjacent side flanges of said segments, and clamping nuts for said bolts.

4. In a repair device, the combination with a split sleeve provided at each end with an annular end packing recess, said sleeve being formed of segments provided at each edge thereof with an outwardly extending side flange, the opposed faces of the side flanges of said segments being each provided with plane compressing surfaces having a longitudinally disposed groove extending from one of said end packing recesses to the other and having outwardly diverging side walls, side packings of compressible material having flat portions for engaging the plane compressing surfaces of the side flanges, and provided on opposite faces with longitudinally disposed beads for engaging said grooves said flat portions extending laterally on both sides of said beads, said beads, when in uncompressed condition, being of greater height than the depth of said grooves, and having outwardly converging lateral faces, and outer faces for engaging the bottoms of the adjacent grooves, the outer surface of said beads being of less width than the bottom of said grooves, and clamping bolts for engaging the adjacent side flanges of said segments, and clamping the flat portions of said side packings between the plane surfaces of said flanges, and simultaneously compressing said beads into interlocking engagement with the side walls of said grooves.

5. In a repair device, the combination with a split sleeve provided at each end with an annular end packing recess, said sleeve being formed of segments provided at each edge thereof with an outwardly extending side flange, the opposed faces of the said flanges of said segments being each provided with plane compressing surfaces having a longitudinally disposed groove extending from one of said end packing recesses to the other, side packings of rubber having flat portions for engaging the plane compressing surfaces of the side flanges, and provided on opposite faces with longitudinally disposed beads for engaging said grooves, said flat portions extending laterally on both sides of said beads, said beads, when in uncompressed condition, being of greater height than the depth of said grooves, clamping bolts for connecting the adjacent side flanges of said segments, end packings for said end packing recesses, a pair of clamping rings each formed of segments having overlapping portions, and bolts connecting said overlapping portions, and provided with end packing engaging portions, and clamping bolts and nuts for drawing the clamping rings into engagement with said end packings.

6. In a repair device, the combination with a split sleeve provided at each end with an annular end packing recess, said sleeve being formed of segments provided at each edge thereof with an outwardly extending side flange, the opposed faces of the said flanges of said segments being each provided with plane compressing surfaces having a longitudinally disposed groove extending from one of said end packing recesses to the other, side packings of rubber having flat portions for engaging the plane compressing surfaces of the side flanges, and provided on opposite faces with longitudinally disposed beads for engaging said grooves, said flat portions extending laterally on opposite faces of said beads, said beads, when in uncompressed condition, being of greater height than the depth of said grooves, said sleeve segments being each provided at each end with a reinforcing flange integrally united with said flanges and provided with bolt holes, side clamping bolts for connecting the adjacent side flanges of said segments, end packings for said end packing recesses, a pair of clamping rings provided with annular end packing engaging portions, and bolt holes adapted to register with the bolt holes in said reinforcing flanges, and clamping bolts engaging the bolt holes in said rings, and reinforcing flanges for compressing said end packings.

GEORGE H. PFEFFERLE.